Nov. 2, 1965   W. DIAN ETAL   3,215,168
WIRE FORMING MACHINE
Filed May 14, 1963   4 Sheets-Sheet 1
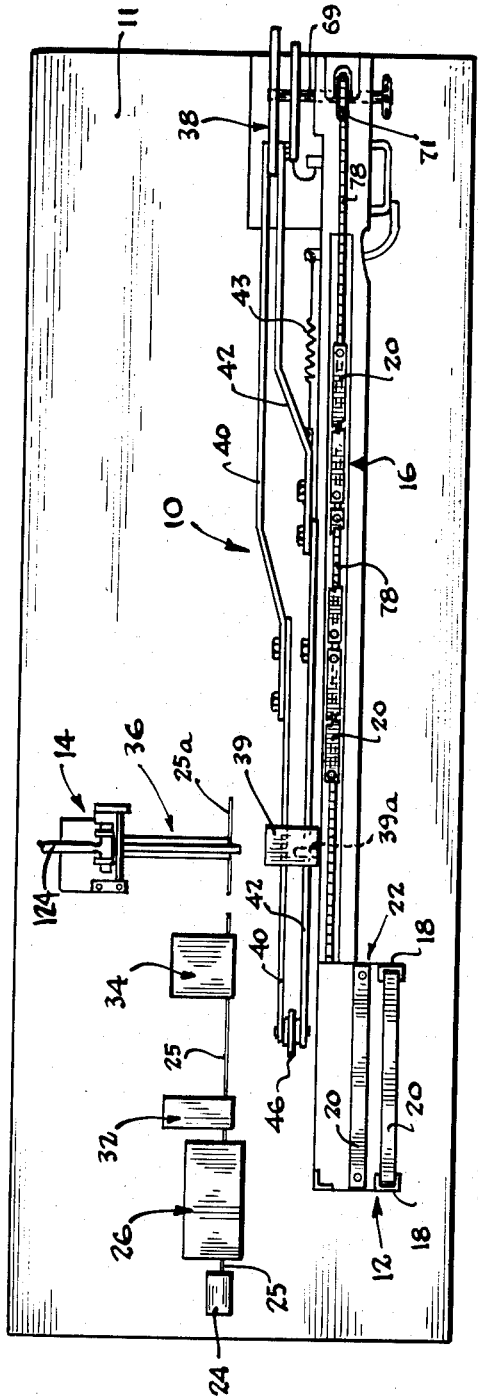
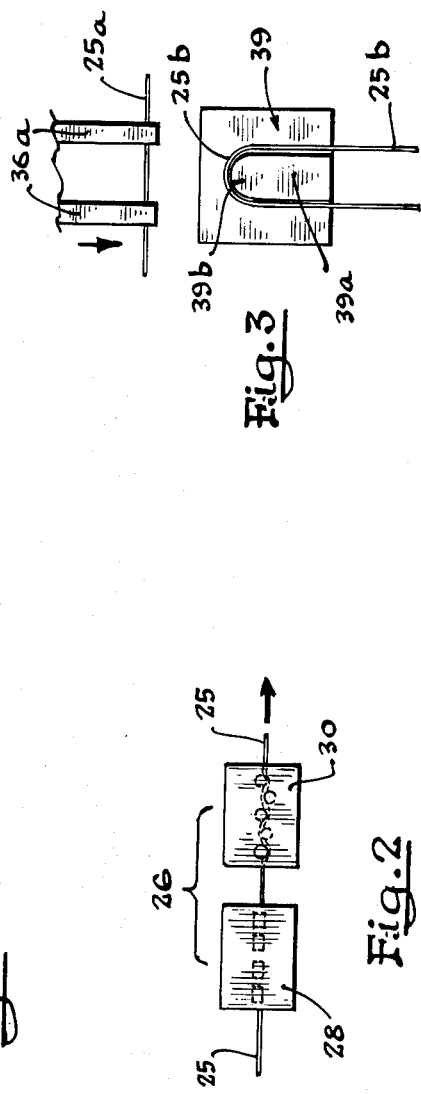
INVENTORS
WALTER DIAN
JOHN J. HOFBAUER
BY George E. Frost-Keith J. Kulie
ATTORNEYS Nov. 2, 1965    W. DIAN ETAL    3,215,168
WIRE FORMING MACHINE Filed May 14, 1963    4 Sheets-Sheet 2

INVENTORS,
WALTER DIAN
JOHN J. HOFBAUER
BY George E. Frost - Keith J. Kulie
ATTORNEYS

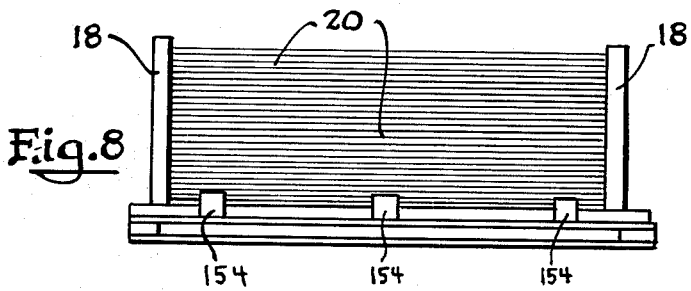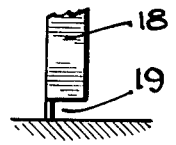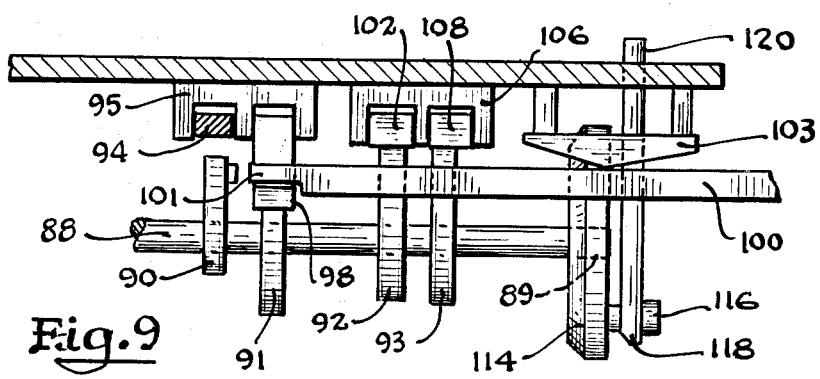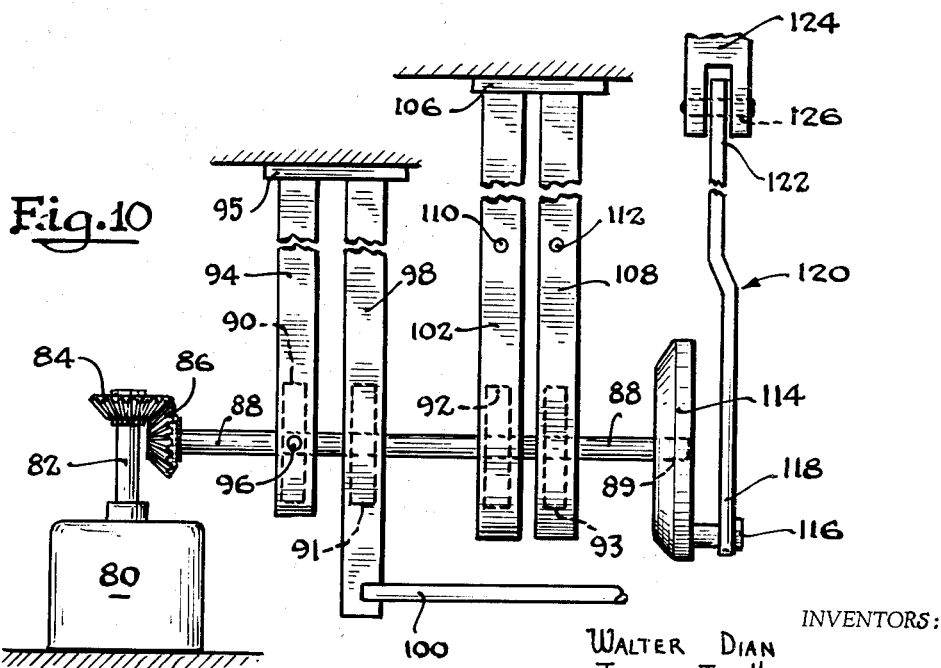

Nov. 2, 1965 W. DIAN ETAL 3,215,168
WIRE FORMING MACHINE
Filed May 14, 1963 4 Sheets-Sheet 4
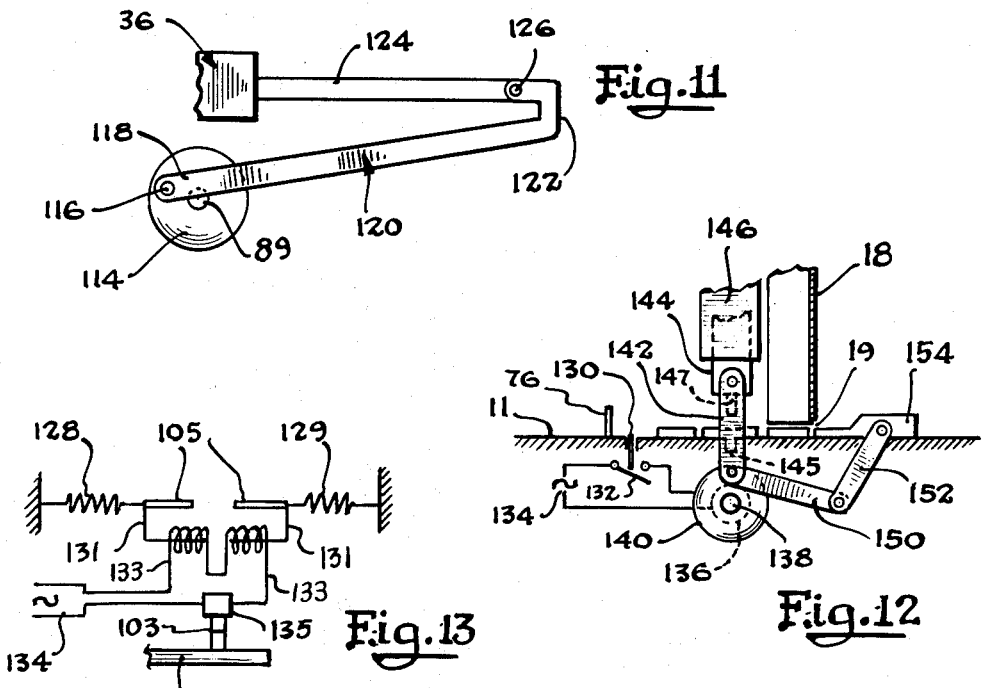
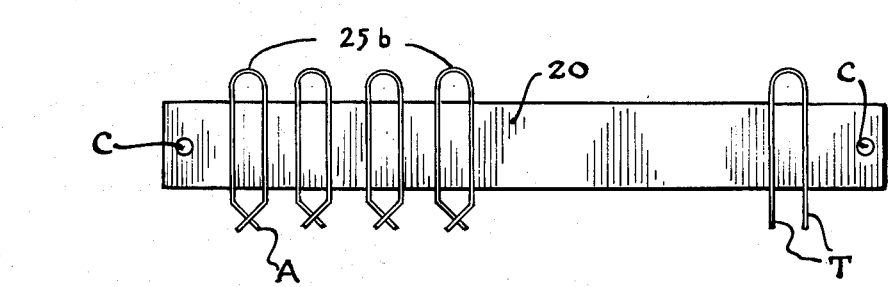
Fig.15
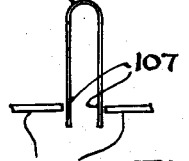
Fig.14
INVENTORS:
WALTER DIAN
JOHN J. HOFBAUER
BY George E. Frost - Keith J. Kulie
ATTORNEYS

United States Patent Office 3,215,168
Patented Nov. 2, 1965

3,215,168
WIRE FORMING MACHINE
Walter Dian, Downers Grove, and John J. Hofbauer, Chicago, Ill., assignors to Die Craft Metal Products, Inc., Chicago, Ill., a corporation of Illinois
Filed May 14, 1963, Ser. No. 280,381
2 Claims. (Cl. 140—71)

The present invention relates to an improved wire forming machine and more particularly it relates to a wire forming machine having an automatic transport and packaging strip feed mechanism.

The manufacture of low cost, small formed items of the type contemplated here must be realized at very high rates and with little manual handling in order to make the process economically feasible. The machine disclosed herein may be adapted for use in forming wire strips of predetermined length for capacitor leads for use in the electronics industry. Of course, other forming uses may also be devised for the apparatus disclosed herein with modification. The forming of capacitor leads is discussed to describe the specific details of the forming apparatus.

It generally is the practice in the manufacture of capacitors, for example, to place each capacitor upon a strip of cardboard, pressed paper, or other hard material suitable for the purpose of conveniently packaging the material for storage, shipment and handling of the small parts. This form of packaging of the capacitors, or other like small manufactured parts, has been realized in a hand operation where each part is hand positioned upon the strip and then fastened thereto. Other equipment for forming and packaging of such parts is adapted to place the parts upon the packaging strips which strips are adapted to move along at a uniform or pretimed rate with respect to the forming component of the wire forming and packaging machine. Still other machines involve positioning of the packaging strips with respect to the forming component of the machine by means upon the strip itself so that positioning is totally dependent upon strip orientation.

The present machine is directed to the provision of apparatus for forming small, low cost parts and at the same time automatically transporting the strip along the machine in accord with the operation of the wire former, the timing and rate of transport being independent of the strip itself. The present machine further contemplates the provision of an automatic strip storage and feed mechanism which is adapted to feed strips continuously and automatically to the transport mechanism of the wire forming machine.

It, accordingly, is a general object of the present invention to provide an improved wire forming machine.

A further object of the present invention resides in the provision of an improved wire forming machine having an automatic packaging strip transport mechanism.

Another object of the present invention resides in the provision of an improved wire forming machine having an automatic packaging strip storage and strip feed mechanism.

An additional object of the present invention resides in the provision of an improved wire forming machine having an automatic packaging strip storage, feed and transport mechanism wherein the formed wire parts are continuously deposited upon said strips at uniformly spaced intervals therealong.

A further object of the present invention resides in the provision of an improved wire forming machine adapted to form lengths of wire into predetermined shapes and to deposit said formed lengths of wire at spaced intervals upon a packaging strip and to fasten said wires to said strips.

Another object of the present invention resides in the provision of an improved wire forming machine having an automatic transport mechanism adapted to move the packaging strips along at stepped intervals and having automatic strip feed means for feeding a series of strips along to the transport mechanism.

The novel features which are believed to be characteristic of the present invention are set forth with particularity in the appended claims. The invention itself, however, together with further objects and advantages thereof, will best be understood by reference to the following description taken in connection with the accompanying drawings, in which:

FIGURE 1 is a top plan view, partly in schematic form, of the wire forming machine;

FIGURE 2 is a fragmentary view of the wire straightening means;

FIGURE 3 is a fragmentary view of the wire forming jaws and the U-shaped forming die;

FIGURE 8 is a side elevation of the strip storage magazine of FIGURE 7;

FIGURE 8A is a fragmentary view of a portion of the magazine of FIGURE 8;

FIGURE 9 is a view of the drive means for the forming machine;

FIGURE 10 is a top view of the drive means of FIGURE 9;

FIGURE 11 is a view of the slide drive means of the wire forming apparatus;

FIGURE 12 is a view of the feed and punch means for perforating and feeding the strips to the strip transport mechanism;

FIGURE 13 is a view of the X-forming apparatus of the wire forming machine;

FIGURE 14 is a view of the X-forming bars of the apparatus of FIGURE 13; and

FIGURE 15 is a view of the wire as formed and deposited upon the strips.

Figure 4:
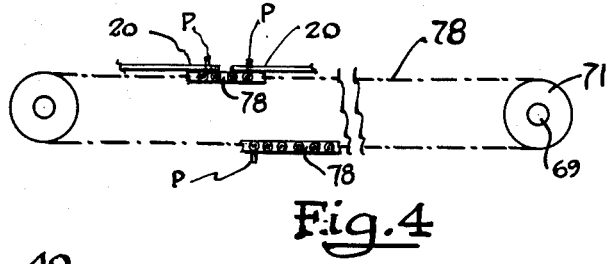
FIGURE 4 is a fragmentary view of a portion of the strip feed mechanism.

Referring more particularly now to FIGURE 1 of the drawings, the wire forming apparatus disclosed herein is indicated generally at 10. The apparatus comprises a strip storage and feed means, indicated generally at 12, wire feed and forming means, indicated generally at 14, and packaging and strip transport means, generally at 16.

The storage means 12 comprises a vertical magazine 18 adapted to store a number of strips 20 in stacked relation therein. The strips 20 are fed individually from the bottom of the magazine 18 to the strip punch means 22 where a hole is punched adjacent either end of the strip 20. The strip 20 is then moved along to the strip transport means 16 as set forth hereinbelow.

Wire for the machine operation is stored on spool 24. The wire 25 is fed from the spool 24 to the wire straighteners 26. The straighteners may be defined by a series of rolls, as illustrated in FIGURE 2, said rolls being positioned in a staggered pattern to cause the wire 25 passing therethrough to be repeatedly flexed. The wire is drawn from the last roll of the straighteners and passes from said vertical 28 and horizontal 30 straightener rolls in straightened form.

The wire 25 passes next to the gripper 32 where it is gripped in sequenced operation. The wire passes from the gripper 32 to the wire shear 34 and then to the forming apparatus 36. The forming means 36 is adapted to bend the severed wire length into a generally U-shaped form as shown in FIGURE 15.

The strip 20 bearing a series of U-shaped formed wire lengths in longitudinally spaced intervals therealong is moved along to the end of the forming apparatus and to the subsequent operation in the forming of capacitors, for example.

Figure 5:
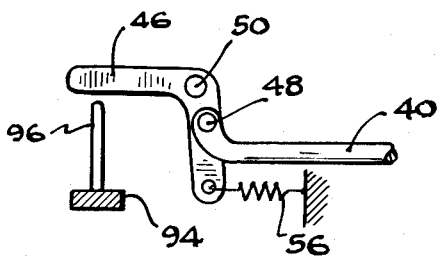
FIGURE 5 is a view of the trip engaging portion of the strip feed and transport means.

The strip transport means comprises ratchet 38 and connecting rods 40 and 42. Connecting rod or arm 40 is joined at one end to the ratchet wheel 58 and at the other end to the crank arm 46, FIGURE 5. As indicated, the connecting arm 40 is pivotally connected to the crank arm 46 at 48. The crank arm 46 is pivotally mounted to the machine frame as indicated at 50. Connecting arm 42 is pivotally mounted to the crank arm 46 on the pin 48 in the same manner as that indicated for arm 40. The crank arm 46 is operatively associated with the pin 96 of the cam follower 94 and is rotated thereby in the manner defined hereinbelow. As defined the cam follower 94 and pin 96 are moved in reciprocatory fashion to move the crank arm 46 in a clockwise direction upon engagement of the pin 96 with the arm 94. When the pin 96 is withdrawn from engagement with the arm 46, the arm is returned to its static position by the spring 56 connected to the arm 46.

Figure 6:
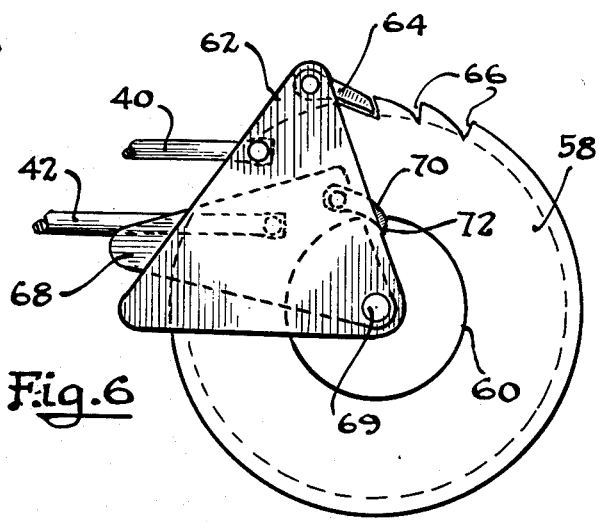
FIGURE 6 is a view of the ratchet portion of the strip transport means.

The ratchet mechanism is illustrated in FIGURE 6 and includes a first ratchet wheel 58 and a second ratchet wheel 60. A first ratchet plate 62 is affixed to wheel 58, said ratchet plate 62 having a pawl 64 pivotally affixed thereto. The pawl 64 is adapted to be received in the notches 66 about the ratchet wheel 58. A second ratchet plate 68 is affixed to the ratchet wheel 60, said plates 68 having a pawl 70 pivotally affixed thereto. The pawl 70 is adapted to be received within the notch 72 of the ratchet wheel 60. Notch 72 is positioned at one position about the periphery of the wheel 60 so that the pawl 70 engages said notch during each revolution of said wheel. The connecting arm 42 is affixed at one end to the ratchet plate 68 and at the other end to the crank arm 46, as described hereinabove.

The ratchet wheel 58 is provided with a series of notches 66 about the periphery thereof equal in number to the number of formed wire lengths to be deposited upon the strips 20. The ratchet wheel 58, pawl 64, and associated transport means are adapted to move the strips 20 along in stepped intervals such that the strip is fully stopped during the interval when the formed wire length is deposited thereon.

Figure 7:
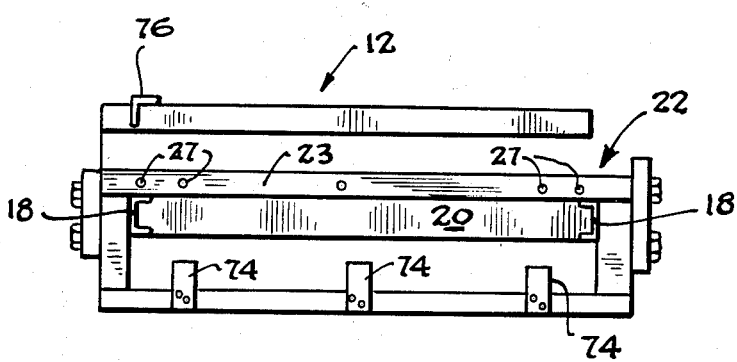
FIGURE 7 is a top view of the strip storage magazine.

As illustrated in FIGURE 1, the strip storage and feed means, indicated generally at 12, is affixed to the apparatus at the wire feed end thereof. The storage magazine 18 is shown in FIGURES 7 and 8. Generally U-shaped vertical members define the strip storage means. The strips 20 are stored in vertically stacked fashion in the magazine.

The strip feed mechanism includes a series of spaced arms 74. The arms 74 are slidably mounted on the storage means and are adapted to be moved into the vertical plane defined by the rack 18. The arms 74, in use, engage the bottom strip 20 of the stacked strips to move it out of the stack and to the punch means. It should be observed that the lower portion of each of the members 18 is provided with a groove 19, said groove adapted to permit the bottom strip 20 of the stack to pass from the confines defined by said members 18. The bottom strip 20 is moved to the punch means 22 where openings are punched in each strip adjacent each end thereof. The bottom plate 23 of the punch means is provided with openings 27 therein adapted to receive a male member of the punch assembly to permit removal of an area of the strip 20. The strip 20 then is moved over the feed means to the transport means 16. The stop guide 76 is provided to position the strip 20 with respect to the transport means to place the strip in the proper position to be engaged by the strip transport mechanism.

The strip transport mechanism 16 includes a chain 78, FIGURES 1 and 4. The chain 78 may be a conventional link chain with upstanding prongs P at spaced intervals therealong. The upstanding prongs P of the chain 78 are adapted to engage the openings in the strips 20 to move the strips along the apparatus. As indicated hereinabove the strips 20 are moved along by engagement with the chain 78 of the strip transport means to position the strip at stepped intervals in front of the forming means for deposition of the formed lengths of wires upon said strips at spaced intervals therealong.

The drive means of the apparatus of the machine set forth herein is illustrated in FIGURES 9 and 10. As indicated, a motor 80 is mounted to the machine frame of the wire forming apparatus. A shaft 82 extends from the motor 80 and is provided with a bevel gear 84 at the outer terminal thereof. The shaft of the motor, preferably is geared down to provide lower angular velocity to the shaft 82 extending from the motor. The bevel gear 84 is in meshing engagement with bevel gear 86. The gear 86 is affixed to shaft 88 which shaft is orthogonally related to the shaft 82 extending from the motor. It should be observed that, if convenient, the shaft 88 may be connected in straight-line relation in proper geared ratio without materially affecting the function of the machine.

A series of shaped cam members 90, 91, 92 and 93 are affixed at spaced intervals along the length of the shaft 88. The cam construction for each cam of the series may be shaped in the form of a suitable oval or any other shape required for desired operation of the drive members of the machine as set forth herein. The cams 90, 91, 92 and 93 of course, are adapted to rotate with the shaft 88. One form of the cams may be circular with eccentric positioning of such cams on the shaft 88.

Cam followers are mounted to the machine frame of the wire forming apparatus or to auxiliary members which in turn are so fastened. Cam follower 94 is pivotally affixed to the machine frame by the pivot member 95. Follower 94 is adapted to move about the pivot 95 and is positioned such that it overlaps the cam 90 of the shaft 88. Rotation of the cam 90 will cause the cam follower 94 to be moved along the cam surface defined by the periphery of the cam 90 thereby to cause the follower 94 to move in reciprocal fashion with respect to the longitudinal axis of the shaft 88. A pin 96 is affixed to the cam follower 94 and extends generally from the upper surface of said cam follower.

Cam follower 98 is pivotally affixed to the machine frame by the pivot member 95. The cam follower 98 is positioned such that it extends outwardly from the pivot 95 over the cam 91 of the shaft 88. The cam follower 98 is adapted to be moved over the cam surface defined by the outer periphery of the cam 91 and to be moved in reciprocal fashion thereby with respect to the longitudinal axis of the shaft 88.

The cam follower 98 defines a camming member for the cam follower 100 illustrated in FIGURE 9. One terminal 101 of the member 100 is positioned upon the outer terminal of the cam member 98 and is adapted to be reciprocally moved in unison therewith, the other terminal of said member 100 (not shown) being pivotally mounted with respect to the machine frame of the wire forming machine disclosed herein. The member 100 is adapted to engage the member 103 of the X-former apparatus (FIGURE 9) to move the jaws of said member toward and away from each other thereby to form the projecting ends of the wire lengths in overlapping fashion as indicated at A in FIGURE 15.

Cam follower 102 is pivotally affixed at one end 106 to the pivot member 106. The member 106 is affixed to the machine frame as schematically presented in FIGURE 10. Cam follower 102 extends outwardly from the pivot member 106 and overlaps the camming surface of the cam 92. The follower 102 is adapted to be moved over the cam surface defined by the outer periphery of the cam 92 to be moved in reciprocal fashion thereby.

Cam follower 108 is pivotally affixed at one terminal to the pivot member 106 of the machine frame, said follower 108 extending outwardly over the camming surface of the cam member 93 to be moved in accord with the movement of the camming surface thereunder.

Pins 110 and 112 are affixed to the cam followers 102 and 108, respectively, and move in unison therewith. The pins 110 and 112 are operatively connected to the wire gripper means and to the wire cutter means, respectively, as set forth herein to, during operation of the apparatus, cause the wire to be gripped prior to severance of a predetermined length thereof for further processing by the wire forming apparatus.

A wheel 114 is non-rotatably affixed to the outer terminal area 89 of the shaft 88 to rotate in unison therewith. An axially offset pin 116 is affixed to the wheel 114. One terminal 118 of the crank arm 120 is pivotally attached to the pin 116 of the wheel 114. The other terminal 122 of the arm 120 is pivotally affixed to the slide control arm 124 by the pin 126.

In operation, the wire is fed from the wire storage spool 24 of the apparatus to the wire straightener 26. The wire is repeatedly flexed in opposite directions in the straightener 26 and is discharged therefrom in straightened form ready for processing in the wire former. The wire is fed from the straightener 26 to the wire gripper 32 of the apparatus. The pin 110 affixed to the cam 102 is adapted to engage suitable mechanical, hydraulic or pneumatic means to bring the jaws of the wire gripper together to tightly engage the wire and rigidly hold it in sequenced operation. The wire gripper defines a conventional pair of gripping jaws associated with appropriate jaw moving apparatus of the type known in the art. The gripper, per se, forms no part of the present invention. The pin 110, for example, may be connected to the armature of a solenoid adapted to urge the jaws into wire gripping relation or to a control valve for an air cylinder adapted to move the wire gripper jaws into engagement with the wire.

The gripped and temporarily rigidly positioned wire is sheared by the wire shear apparatus 34 of the wire forming machine. The shear or wire cutter 34 is energized through the pin 112, which pin in turn is affixed to the cam 108. As the cam 108 is moved reciprocally by the cam 93 on the shaft 88 the pin 112 serves to move, through mechanical interconnection, the cutter knife of the cutter 34 into and out of the patch assumed by the wire 25 during passage thereof along the wire forming apparatus. The wire cutter is of the type known to the art in various forms and of itself forms no part of the present invention.

The wire 25 extends from the wire cutter into the forming apparatus 36 of the wire forming machine. The cut wire length is held in suitable clamping jaws 36a in the wire forming mechanism 36. For each revolution of the shaft the wire retaining jaws 36a of the wire forming mechanism 36 are transported under action of a solenoid, air cylinder, hydraulic cylinder, or the like, toward the forming die 39 of the apparatus. The cut wire length 25 is held in straight manner as illustrated at 25a in FIGURE 1. The wire 25a is brought into engagement with the generally U-shaped die portion 39a of the die 39. As the jaws 36a of the wire forming apparatus are moved along into mating engagement with the U-shaped die 39a, each jaw of the pair 36a passes along one side of the die 39a. The terminal portions of the wire length 25a are moved along down the sides of the die 39a while the central portion of the wire length is in abutting engagement with the rounded nose 39b of said die 39a. When the jaws 36a have extended the full length of travel they open to release the wire length 25a which now is in the general form of a U as illustrated by the lines 25b of FIGURE 3.

The die 39 then is moved along toward the transport mechanism 16 of the apparatus. At the terminal portion of travel of the die 39 the terminal portions of the U-shaped wire section 25b extend slightly over the opposite side of the packaging strip 20 as indicated at T in FIGURE 15 of the drawings. At this moment of operation the cam 103 of the X-forming appaartus is rocked due to upward movement of the cam 100 upon which it rides. Upward movement of the cam 103, as indicated, serves to close the X-forming jaws 105, FIGURE 13. The terminal portions of the formed wire length 25b are supported in the inboard side thereof by members 107 so that as the jaws 105 are closed the terminal portions are passed inwardly along a portion of the length thereof as indicated at A in FIGURE 15, so that they are in overlapping relation along said terminal portions.

Reciprocatory movement of the wire forming apparatus 36 is defined through the slide drive mechanism. As illustrated in FIGURE 11, the wire forming apparatus 36 is operatively interconnected to the slide control arm 124, crank arm 120 and wheel 114. Rotation of the shaft 88 (and terminal 89 thereof) as defined hereinabove will cause wheel 114 to rotate in unison therewith. The crank arm 120 is eccentrically pivotally mounted to the wheel 114 by the pin 116. Rotation of the wheel 114 will cause the arm 120 to convert the rotary motion of wheel 114 to oscillating linear movement. Oscillation of the crank arm 120 will thereby, through the arm 124, cause the wire forming means 36 to be moved in oscillatory fashion in unison therewith. Means, of the type shown herein, to form cut wire lengths into a generally U-shaped configuration are known to the art. In substance, however, such forming means are adapted at one terminal of their movement to receive a wire length and to clamp it in suitable wire receiving jaws. The forming means then is moved into operative engagement with a shaped die so that the wire may be bent or formed into the desired shape. The cut wire length is released by the jaws when the forming means reaches the opposite terminal of operative travel. The former returns to its initial position ready to receive another length of wire.

The wire section 25b as completely formed, with the terminal portions in overlapping relation is deposited upon the transport strip 20. At this point in the sequence of operation the shaft 88 has rotated to the point where the wire forming apparatus 36 is returned to the starting position and the cam follower 94 is in elevated position. In this position the pin 96 of the follower 94 pivots the arm 46 to pull the arms 40 and 42 along through one stroke. The arm 40 is interconnected, as defined hereinabove, to the strip transport mechanism. The stroke movement of the arm 40 is adapted to rotate the plate 62 through one stroke. As illustrated in FIGURE 6 of the drawings the plate 62 will be rotated counter-clockwise through one stroke and upon the return to starting position will rotate the plate 58 and shaft 69 through one stroke. Shaft 69 is directly connected to the plate 58 and sprocket 71 defining one rotative support for the drive 78 of the transport mechanism. The other rotative support for the chain drive 78 is defined by the sprocket 73 position adjacent the strip feed means of the wire forming machine. As the sprocket 71 is moved through one stroke the chain 78 is likewise moved along through the distance represented by one stroke of the transport mechanism. This distance is sufficient to move the strip 20 along by the wire forming apparatus 36 so that the next succeeding space on the strip 20 is presented and the next formed wire length 25b may be deposited thereon. As indicated hereinabove, the strip 20 is engaged by the chain drive 78 of the transport mechanism by the upstanding projections of said mechanism which are adapted to be received in the openings which are provided adjacent the terminals of the strips 20.

Once during each complete cycle of the drive mechanism the pawl 70 of the plate 68 engages the recess 72 of the drive plate 60. The diameter of revolution of the plate 60 and the action of the plate recess and pawl are provided such that the plate 60 will drive the shaft 69 through an angular distance sufficient to move the chain 78 a linear distance equal to the distance defined between successive openings in adjacent transport strips 20. The plate 60 and plate 58 are defined in diameter and recess openings in combination with their associated drive arm movements such as to provide movement of the strip 20 at spaced intervals to provide for deposition of the formed wire lengths and to provide for rapid spaced movement during the interval between strips thereby permitting continuous machine operation. The plate 68 of the drive mechanism for the transport strip 20 is connected to the arm 42, which arm in turn is connected to the crank arm 46 of the primary drive mechanism. A spring 43 is connected to the arm 42 to bias the arm toward the plate 60 and to facilitate movement of the arm 42 and therethrough of plate 60.

Operation of the strip feed means and the associated punch means is defined in conjunction with FIGURE 12, wherein a sensor 130 may be positioned in the path of the strip travel along the apparatus in position therealong such that it will sense the absence of a strip from the feed area of the transport means and engage the strip feed mechanism to move another strip 20 into position on the feed area of the strip transport means. The sensor 130 projects through the support table 11 of the wire forming machine and extends slightly above the surface of said table 11. Sensor 130 is connected to a switch 132 which switch completes the electrical circuit from an alternating current source 134 to a suitable electrically powered motor 136. The shaft 138 of the motor 136 is interconnected to a drive wheel 140 of the strip feed and punch means.

A link arm 142 is pivotally interconnected at one end to the drive wheel 140, in eccentrically defined position thereon, and at the other end thereof to a reciprocally movable punch 144. The punch 144 is guidingly received in a suitable guide means 146 which guide the punch for vertical movement toward and away from the table 11. Openings 145 are provided in the table 11 to receive the punch die 147 of the punch means. It can readily be seen that as the drive wheel 140 is moved from the position shown in FIGURE 12, the link arm 142 will urge the punch towards the table 11 and move the die 147 into telescopic relation with the openings 145 of table 11.

Link arm 150 is pivotally connected at one end to the drive wheel 140 and at the other end to link arm 152. The free end of arm 152 is connected to the slide 74. As the drive wheel 140 is cycled the linkage between the wheel 140 and the slide 74 urges the slide, in oscillating fashion, into registration with the opening 19 of the magazine 18 to push the bottom strip 20 from the stack and into registration with the punch means.

In operation, when a strip 20 is removed from the transport feed area 21 the sensor 130 moves upwardly, it being biased to that position. This movement of the sensor closes the switch 132 and completes the electrical circuit to the motor 136. The motor 136 is adapted to move through one revolution and rotate the wheel 140 through one revolution. Rotation of the wheel 140 in a clockwise direction, FIGURE 12, activates the punch member and subsequently brings the slide into registration with the openings 19 to move the bottom strip 20 of the stack in the magazine 18 under the punch means, pushing a preceeding strip 20 into the transport feed area 21. The punch means punches openings C, FIGURE 15, in the strips 20. The openings C of the strip 20 are engaged by the projections P of the chain 78 as the chain moves along the transport means thereby to bring the strip into active position in the apparatus.

As the projection P of the chain 78 engages the opening C of the strip 20 said strip is then moved along in step-by-step motion by the strip transport means 16. The strip 20 is moved along the apparatus to bring it in front of the wire forming means 36 where formed wire lengths (formed in the manner defined hereinabove) are deposited upon the strip 20 in the form shown at T, FIGURE 15. After the formed wire 25b is deposited upon the strip 20 it preferably is secured to the strip by pressure sensitive tape, or the like.

The free ends of the formed wire T must be folded in overlapping relation in order to provide means for grasping and holding the dielectric disc adapted to be positioned therebetween to define the electrical capacitor. Such forming means, FIGURE 13, is provided by the jaws 105. As indicated, the jaws 105 are biased to static or rest position by the members 128 and 129. The jaws 105 are interconnected through arms 131 to the armature of solenoids 133.

The solenoids 133 are electrically interconnected to a suitable alternating current source 134 through a switch 135. The switch 135 is operated through the cam follower 103 which is adapted to move in response to movement of the follower 100. As indicated hereinabove, the movement of the cam follower 100 is sequenced by rotation of the shaft 88 and the associated camming mechanisms. The follower 100 is adapted to be elevated at the moment that the wire forming apparatus 36 moves the formed wire length into position on the strip 20 such that the free ends T project beyond the edge of the strip 20. Elevation, or upward reciprocatory movement, of the cam follower 100 causes the switch 135 to close through action of arm 103 thereby to complete the solenoid circuits and draw the solenoid armatures into the coils. The jaws 105 are likewise drawn toward each other thereby deflecting the free ends of the formed wire length inwardly in overlapping folded relation as shown at A, FIGURE 15.

As the cam 100 moves down, the solenoid circuit is interrupted and the jaws 105 moved away from the wires under action of resilient members 128 and 129. The strip 20 is stepped along by the strip transport means to the next interval where the wire forming operation is repeated, as set forth hereinabove, until the strip is complete.

It should be observed that if pre-punched strips 20 are employed in the apparatus set forth hereinabove the vertical storage magazine 18 may instead be positioned directly in line with the longitudinal axis of the strip engaging chain 78 in position such that the projections P of the chain 78 will engage the opening in the bottom strip of the stack and thereby pull it from the stack for use.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What is claimed is:

1. A wire forming machine adapted to form a length of wire into generally U-shaped configuration with overlapping end portions and to deposit said formed length of wire upon a flat unslit packaging strip to be affixed thereto, said machine comprising:
   a machine frame;
   power means mounted on said fame;
   wire feed means mounted on said frame and operatively associated with said power means, said wire feed means adapted to straighten the wire lengths and to cut the wire into predetermined lengths;
   wire forming means mounted on said machine frame and operatively associated with said power means, said forming means adapted to shape the length of wire into generally U-shaped from with overlapping ends, said forming means further adapted to deposit said formed wire upon the unslit packaging strip for affixing thereto;

transport means for said packaging strip adapted intermittently to move said strip along in stepped movement so that the formed wire will be deposited at spaced intervals flatly along the surface of said strip; and strip storage, punch and feed means adapted automatically to feed punched strips to said packaging strip transport means, said strip storage means including a magazine to store a plurality of strips in stacked relation therein, said magazine having an opening at the bottom thereof, said feed means including a slide member adapted reciprocally to move into and out of registration with the opening of the magazine to move the bottom strip of said stack of strips into position in registration with the punch means, said punch means in sequence extending into said positioned strips to punch openings at predetermined positions in said strip, the punched strip being moved in the next feed operation into position for engagement by said transport means to move the strip along to receive the formed wire lengths.

2. A wire forming machine adapted to form a length of wire into generally U-shaped configuration with overlapping end portions and to deposit said formed length of wire upon a flat unslit packaging strip to be affixed thereto, said machine comprising:

a machine frame;

power means mounted on said frame;

wire forming means mounted on said machine frame and driven by said power means, said forming means forming the length of wire into U-shaped form with overlapping X-shaped ends, said forming means further adapted to deposit the formed wire upon the unslit packaging strip for affixing thereto;

transport means for said strip adapted intermittently to move said strip along in stepped movement so that the formed wire will be deposited at spaced intervals flatly upon the surface of said strip; and strip storage, punch and feed means adapted automatically to feed punched strips to said packaging strip transport means, said strip storage means including a magazine to store a plurality of strips in stacked relation therein, said magazine having an opening at the bottom thereof, said feed mans including a slide member adapted reciprocally to move into and out of registration with the opening of the magazine to move the bottom strip of said stack of strips into position in registration with the punch means, said punch means in sequence extending into said positioned strip to punch openings at predetermined positions in said strip, the punched strip being moved in the next feed operation into position for engagement by said transport means to move the strip along to receive the formed wire lengths, said transport means of the machine having upstanding projections at spaced intervals therealong to engage the punched openings in the strip and move the strip along in programmed fashion.

References Cited by the Examiner

UNITED STATES PATENTS

| | | | |
|---|---|---|---|
| 2,599,547 | 6/52 | Feyrer | 140—87 |
| 2,766,510 | 10/56 | Heibel | 29—25.42 |
| 3,079,957 | 3/63 | Weiss | 140—71 |
| 3,080,908 | 3/63 | Weiss | 153—34 |
| 3,091,835 | 6/63 | Weiss | 29—25.42 |

CHARLES W. LANHAM, *Primary Examiner*.